United States Patent [19]

Takagawa

[11] Patent Number: 4,700,313
[45] Date of Patent: Oct. 13, 1987

[54] PLURAL TURRET SYSTEM WITH DISPLAY OF PERMITTED AND NON-PERMITTED SIMULTANEOUS MACHINING OPERATIONS

[75] Inventor: Kiyoshi Takagawa, Aichi, Japan

[73] Assignee: Mitsubishi Denki Kabushiki Kaisha, Tokyo, Japan

[21] Appl. No.: 11,346

[22] Filed: Feb. 2, 1987

Related U.S. Application Data

[63] Continuation of Ser. No. 843,835, Mar. 26, 1986, abandoned, which is a continuation of Ser. No. 580,309, Feb. 15, 1984, abandoned.

[30] Foreign Application Priority Data

Feb. 16, 1983 [JP] Japan .................................. 58-23984

[51] Int. Cl.$^4$ ............................................. G06F 15/00
[52] U.S. Cl. ..................................... 364/474; 318/568; 82/25
[58] Field of Search ............... 364/148, 167, 171, 180, 364/181, 188, 189, 191, 192, 474, 475; 318/567, 568, 569, 590, 591, 600; 29/27 R, 27 C, 35.5, 36, 39, 568; 82/25

[56] References Cited

U.S. PATENT DOCUMENTS

| | | | |
|---|---|---|---|
| 3,968,415 | 7/1976 | Hafla et al. | 318/569 |
| 4,033,206 | 7/1977 | Morita et al. | 364/475 X |
| 4,092,720 | 5/1978 | Carey | 364/474 |
| 4,312,105 | 1/1982 | Brown | 29/39 |
| 4,424,569 | 1/1984 | Imazeki et al. | 364/474 |
| 4,428,055 | 1/1984 | Kelley et al. | 364/474 |
| 4,472,770 | 9/1984 | Li | 364/148 |
| 4,528,633 | 7/1985 | Sakai et al. | 364/474 |
| 4,558,419 | 12/1985 | Kanematsu | 364/474 |

FOREIGN PATENT DOCUMENTS 1567762 5/1980 United Kingdom .

Primary Examiner—Jerry Smith
Assistant Examiner—Allen MacDonald
Attorney, Agent, or Firm—Sughrue, Mion, Zinn, Macpeak & Seas

[57] ABSTRACT

A numerically controlled machining system in which plural simultaneous machining operations can be carried out. A display is effected in matrix form of all combinations of machining operations which can be performed by various tools of the machining system, for instance, a lathe. The operator can readily select among the various possible combinations to make maximum use of the available machining tools.

10 Claims, 7 Drawing Figures

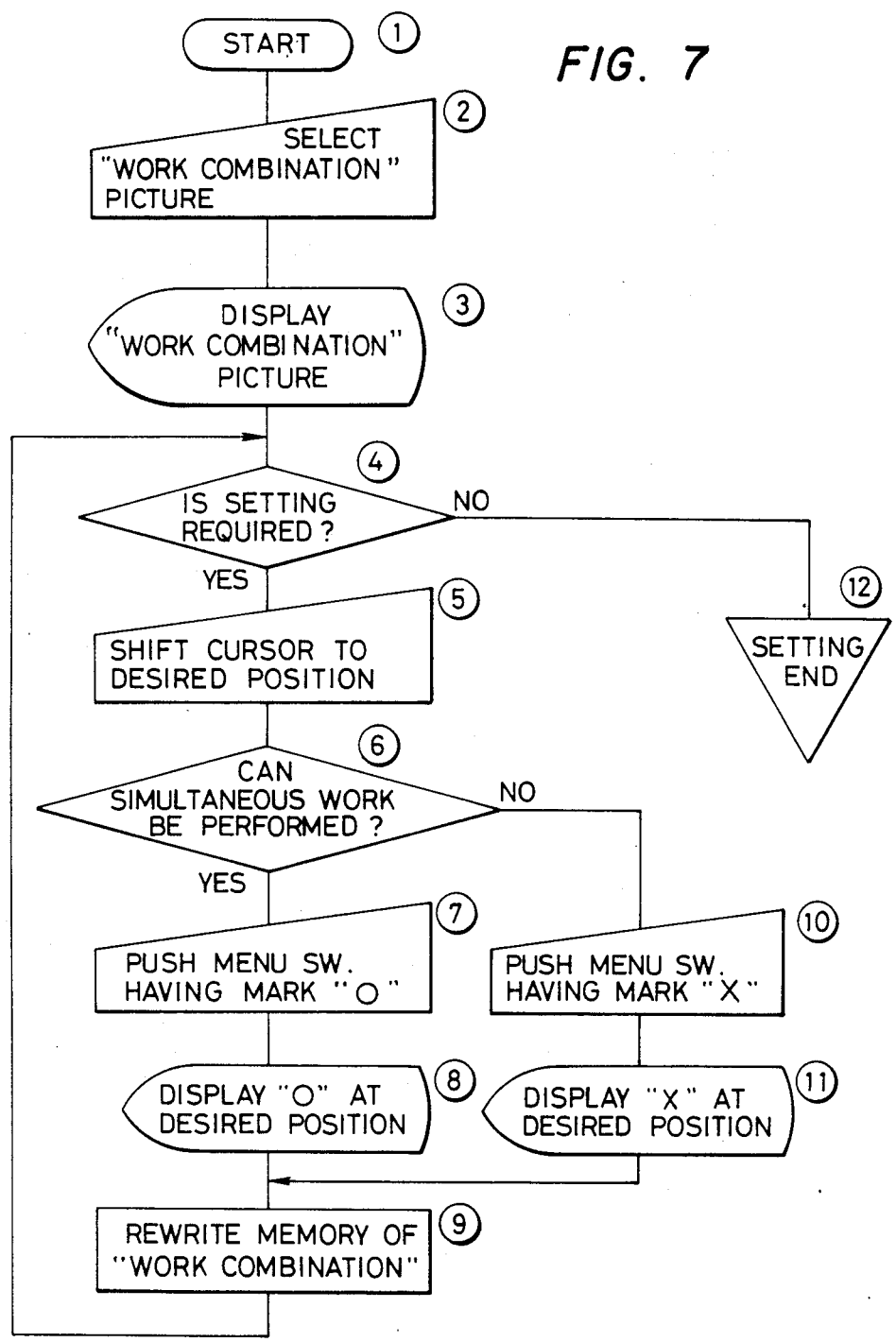

PLURAL TURRET SYSTEM WITH DISPLAY OF PERMITTED AND NON-PERMITTED SIMULTANEOUS MACHINING OPERATIONS

This is a continuation of application Ser. No. 843,835, which is a continuation of application Ser. No. 580,309 filed Feb. 15, 1984, both abandoned.

BACKGROUND OF THE INVENTION

The present invention relates to an NC (numerically controlled) machining system in which a machining head is controlled by NC control device to machine a workpiece to a desired configuration. More particularly, the invention relates to an NC machining system in which a plurality of turrets are simultaneously controlled.

In a conventional NC machining system, the position of a tool relative to a workpiece is controlled by numerical information specifying the position of the tool. This numerical data is provided by an NC control system. With such a system, a workpiece can be machined to a complex shape with high accuracy and at a high rate, thereby yielding high productivity.

Generally, an NC machining system is constituted, as shown in FIG. 1, by an NC control device 20 which operates upon numerical information inputted by a terminal 10, and an NC machining device 30 which is controlled by the numerical values provided by the NC control device 20. The NC control device 20 includes an input section 21 through which externally supplied instructions are inputted, a computing section 22 for operating upon the instructions received via the input section 21, a memory section for storing results of operations performed by the computing section 22, a control section 24 for controlling the operation of the computing section 22, an output section 25 for sending computed values produced by the computing section 22 to the NC machining device 30, and the display section 26, which includes the keyboard, for inputting and displaying the data, including the data received via the input section 21, the outputs produced by the output section 22, and the contents of the memory section 23.

The machining device 30 includes a tool 31 attached to a tool holder 32, which is in turn attached to a chuck of a spindle 33. The splindle 33 is rotated by a spindle motor drive 34, which is in turn driven by a signal provided by the output section 22 of the NC control device 20. A workpiece 40 is fixed to a table 35 of the machining device 30 by a jig or the like. As indicated in FIG. 1, a screw 36 is provided for moving the table 35 in the direction of the X axis. The screw 36 is driven along the X axis by a motor 38 through a gear box 37. The motor 38 is controlled by a signal produced from the output section 25 of the NC control device 20. Similarly, screws, motors and gear boxes are provided for moving the table 35 in the Y and Z directions in response to signals produced by the output section 25 of the NC control device 20.

It as previously been proposed to provide a lathe with a plurality of rotating tools. An example of such a lathe is shown in outline form in FIG. 2. As shown in FIG. 2, a cylindrical workpiece 110 is held at one end by a chuck 101, the latter being rotated around the Z axis. The other end of the workpiece 110 is supported by the tip 102a of a tail stock 102. Cutting tools 105 and 106 are provided for cutting the workpiece 110. The tools 105 and 106 are fixed to first and second turrets 103 and 104, respectively. To cut the workpiece 110, the first and second turrets 103 and 104 are moved in the direction of the Z axis.

Conventionally, the instructions for moving each turret are supplied to the NC control device 20 externally. This is done utilizing a so-called G code, which is a language peculiar to the field of numerical control. Accordingly, an NC machining system of this type cannot easily achieve fully automatic programming in which various data, such as data indicating the type of the cutting tool, cutting conditions, and the like, are supplied by a keyboard associated with the display section 26. Further, the conventional system suffers from a drawback in that it is very difficult to instruct and control the operation of two cutting tools simultaneously.

SUMMARY OF THE INVENTION

It is accordingly the primary object of the present invention to overcome the above-noted drawbacks.

More specifically, it is an object of the invention to provide an NC machining system in which instructions for machining can more freely be prepared, thereby reducing the amount of time required for an operator to perform machining operations.

Achieving the above and other objects, the invention provides an NC machining system in which a memory is provided for storing indications of permitted and non-permitted combinations of machining operations for plural machining tools such as rotary tools. Means are provided to order the sequence of machining operations based upon the content of the memory. The contents of this memory are displayed on the display device of the system, and means are provided by which the display and hence the memory content can readily be altered, thereby shortening the time required for performing composite machining operations.

BRIEF DESCRIPTION OF THE DRAWINGS

FIG. 7 is a flowchart used for explaining the operation of the invention.

DESCRIPTION OF THE PREFERRED EMBODIMENTS

Referring to FIGS. 3 to 7 of the drawings, the present invention will now be described in detail.

Figure 1:
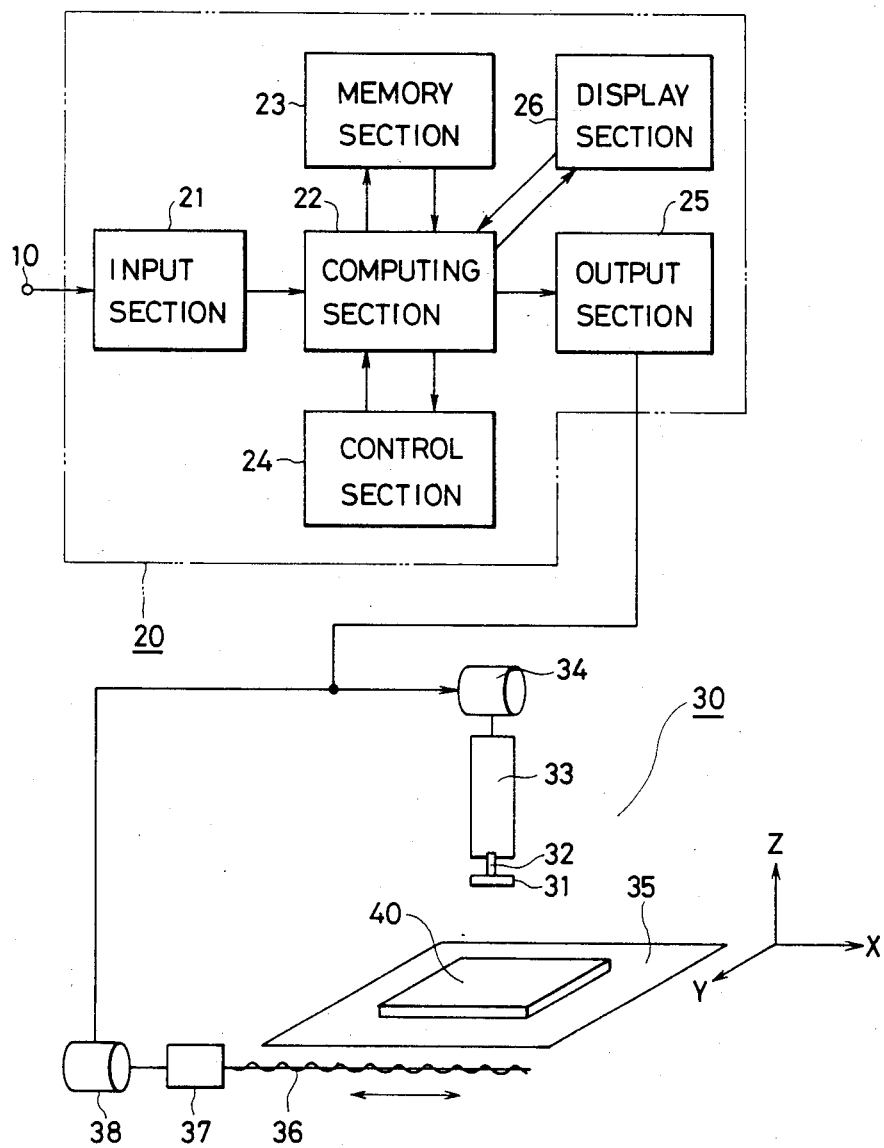
FIG. 1 is an explanatory diagram of a conventional NC machining system.
Figure 2:
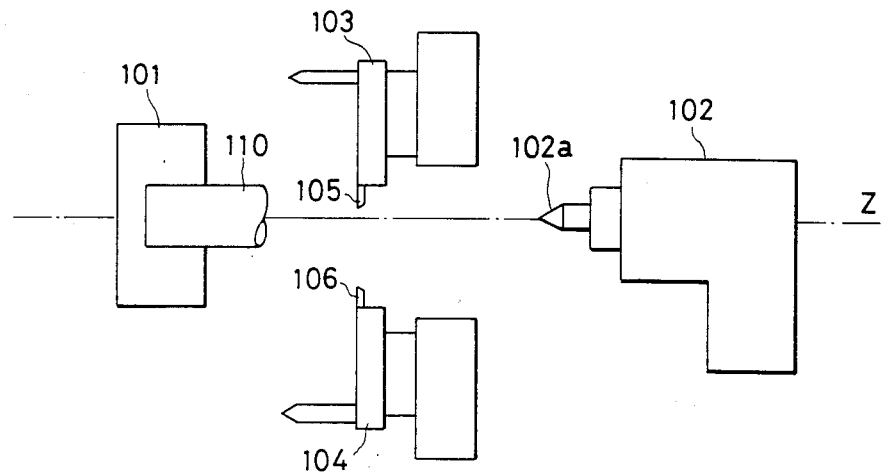
FIG. 2 is an explanatory diagram in outline form showing the basic arrangement of a lathe having plural machining tools.
Figure 3:
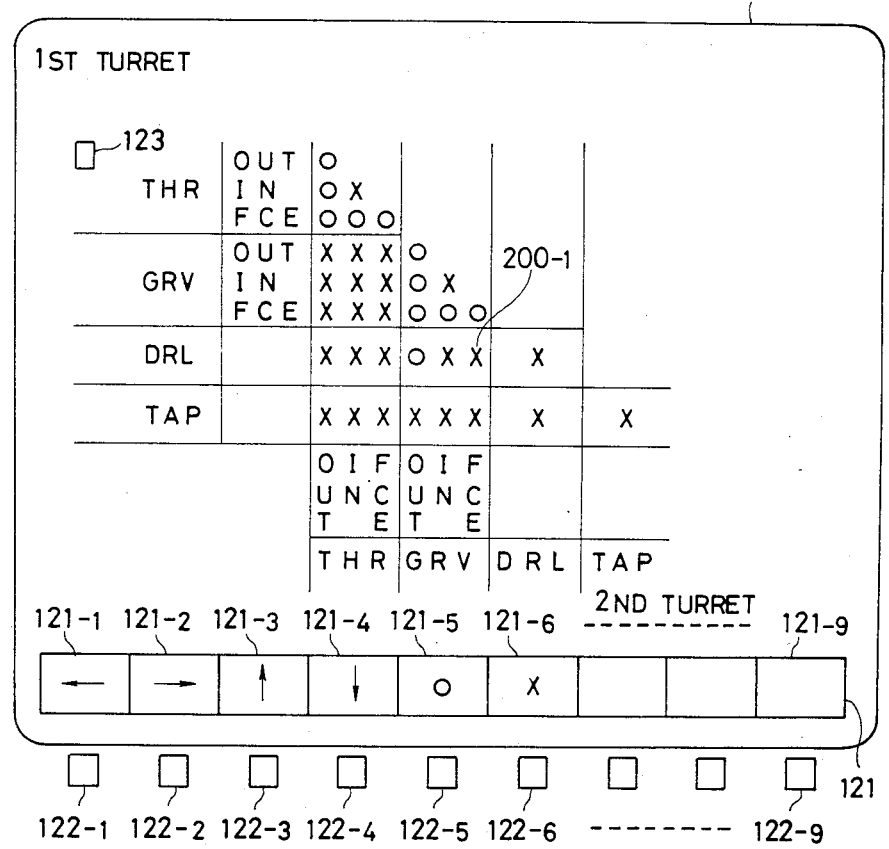
FIGS. 3 through 5 depict data displayed on a display device when the present invention is employed.

FIG. 3 shows a display which is produced when the present invention is employed. As indicated in FIG. 3, combinations of operations to be performed by the first and second turrets 103 and 104 are displayed on a display 120. On the display 120, a menu display section 121 is reserved for displaying the indications of nine different menus 121-1 to 121-9. Below the display 120, menu selection switches 122-1 to 122-9 are provided for selecting among the menus 121-1 to 121-9, respectively.

Within the display 120, information related to the machining operations to be performed by the turrets is read out of a work combination memory and displayed. In the case of a lathe, THR (THREAD) represents the case in which threads are to be cut, GRV (GROOVE) indicates the cutting of grooves, DRL (DRILL) indicates drilling, and TAP (TAPPING) indicates a tapping operation. OUT represents an outer diameter, IN represents an inner diameter, and FCE (FACE) represents end face surface machining.

Figure 4:
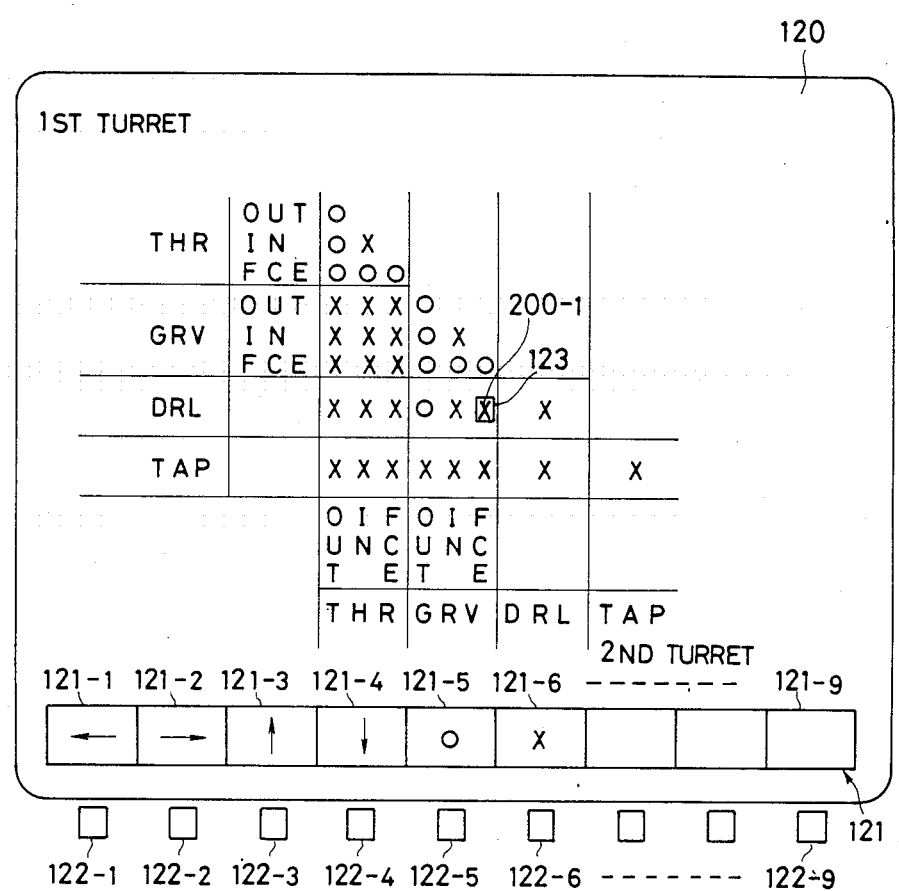
Figure 5:
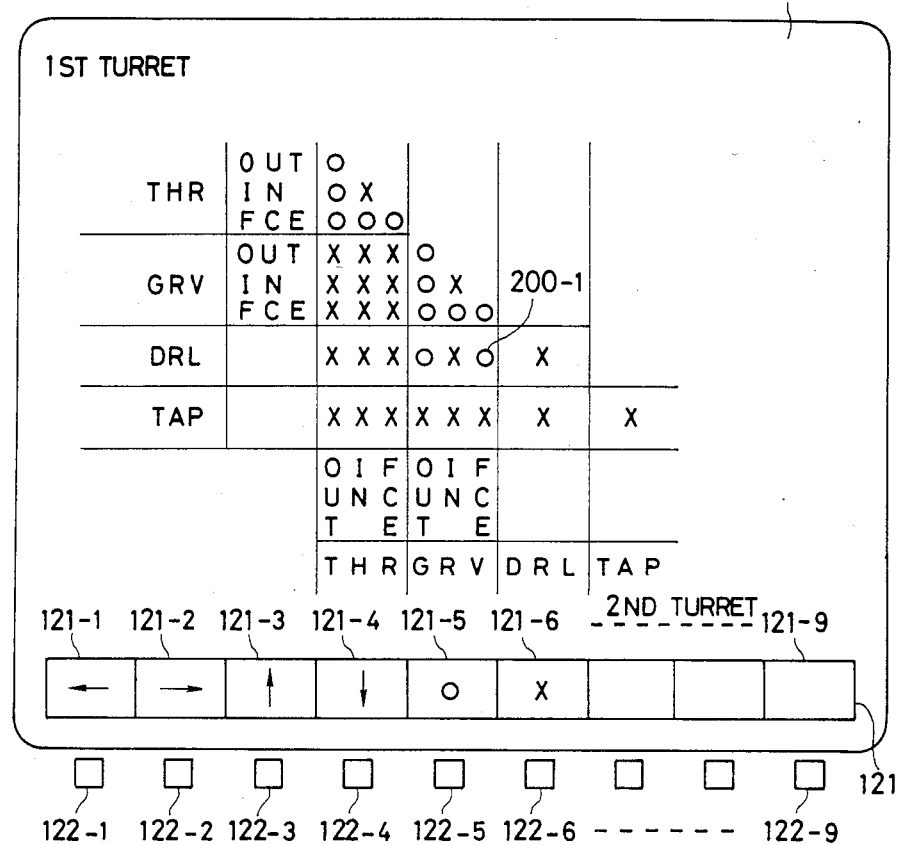
Figure 6:
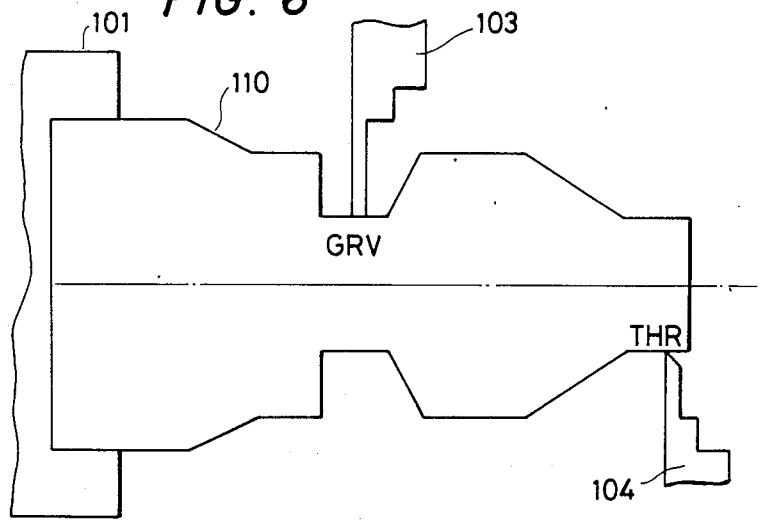
FIG. 6 is an outline diagram showing how first and second turrets can simultaneously be moved.

The possible combinations of operations of the first and second turrets 103 and 104 are displayed in a matrix as shown in FIG. 3. The letter "O" indicates that the indicated operations may be performed simultaneously, while letter "X" indicates that the given operations will not be performed simultaneously. The operator can observe the various combinations of operations of the first and second turrets 103 and 104, and hence fully understand that it is possible for drilling with the first turret 103 and outer diameter grooving with the second turret 104 to be carried out simultaneously. The change the indications on the display (and to thus change the corresponding value in the memory), the operator suitably actuates the menu switches 122-1, 122-2, 122-3 and 122-4 (cursor movement keys) corresponding, respectively, to a left correction shifting menu 121-1, a right correction shifting menu 121-2, an upward correction shifting menu 121-3, and a downward correction shifting menu 121-4, to thereby move cursor 123 from the initial position indicated in FIG. 3 to, for example, a position 200-1 as indicated in FIG. 4. Thereafter, the operator can actuate a menu selection switch 122-5, corresponding to the menu 121-5, which will cause the display of the make "O" at the position 200-1, as indicated in FIG. 5. The memory is thus made to contain an indication that first turret drilling and second turret face grooving are simultaneously possible.

As a further example, the display of FIG. 3 indicates to the operator that simultaneous grooving by the first turret 103 and thread cutting by the second turret 104 cannot be achieved. On the other hand, the display of FIG. 6 indicates that such is possible. In the latter case, i.e., where such simultaneous actions are possible, or become possible the operator may suitably actuate the menu selection switches to enable such simultaneous working and to reset the display to cause the display of the mark "O", at an appropriate location or locations of the display, in the same manner as discussed above.

Accordingly, by displaying in matrix form the contents of a work combination memory (not shown) which stores the combinations of possible machining operations of the first and second turrets 103 and 104 on the display 120, instructions for the operations of the first and second turrets 103 and 104 can easily be prepared in a short period of time.

FIG. 7 is a flowchart useful in explaining the operation of the above-described embodiment of the present invention. In the drawing, reference numerals 1 to 12 designate various steps. In Step 1, the start of operations is effected. In Step 2, a particular "work combination" image picture is selected, and then displayed in Step 3. If a setting (work combination data correction) operation is required, in Step 4, the cursor is shifted to a desired position in Step 5. If the desired combination of operations by the first and second turrets 103 and 104 can be performed, as determined in Step 6, the content of the work combination memory is rewritten in Step 9 upon the depression in Step 7 of the menu selection switch corresponding to the "O" sitting menu. The mark "O" is displayed at the desired position on the display in Step 8, thereby enabling the desired combination of operations. If the desired combination of operations of the first and second turrets 103 and 104 cannot be performed, as determined in Step 6, the content of the work combination memory is rewritten upon the depression of the menu selection switch corresponding to the "X" marking menu that is switch 122-6, in Step 10. The mark "X" is displayed at the desired position on the display 120, thereby indicating that the desired combination of the operations cannot be performed. If no setting operation is required at Step 4, the setting operation is terminated in Step 12. These operations can be repeated.

If three or more turrets are provided, time-successive display of the various combinations of operations of the three turrets can be performed.

Although a lathe has been considered as an example, the present invention is not limited to a lathe, but is more generally applicable to any other NC machining system.

As described above, according to the present invention, combinations of possible simultaneous operations performable by a plurality of turrets are displayed in matrix form, and the selection of actual working combinations is achieved by selection from this matrix. Accordingly, employing the invention, the overall time required for machining program preparation is markedly reduced, thereby providing greater work efficiency.

I claim:

1. A numerically controlled machining system including a machining device having a plurality of turrets for performing plural machining operations, said machining device being controlled by a numerical control device, comprising:
   means for storing in a memory of said numerical control device data indicating combinations of possible simultaneous operations of said turrets;
   means for displaying, in response to the data stored in the memory, an image including indications of permitted and non-permitted combinations of simultaneous operations of two of said turrets;
   means for modifying said displayed indications and for rewriting said memory in accordance with said modifications; and
   means for determining an order of performing machining operations in response to the content of said memory.

2. The numerically controlled machining system as claimed in claim 1, wherein said modifying means comprises a plurality of menu selection switches.

3. The numerically controlled machining system as claimed in claim 2, wherein said menu selection switches comprise switches for instructing the position of a cursor on said display means and means for causing the display of said indications of said permitted and non-permitted combinations of operations.

4. The numerically controlled machining system as claimed in claim 1, wherein said machining device comprises a lathe.

5. The numerically controlled machining system as claimed in claim 4, wherein said lathe has four turrets.

6. The numerically controlled machining system as claimed in claim 4, wherein said lathe comprises turrets capable of effecting grooving, drilling and tapping.

7. The numerically controlled machining system as claimed in claim 6, wherein each turret of said lathe includes means for working the outer diameter of a workpiece, an inner diameter of the workpiece and a front end face of the workpiece.

8. The numerically controlled machining system as claimed in claim 1, wherein at least three turrets are provided, and wherein said display means displays in matrix form the permitted and non-permitted combinations of two turrets at a time.

9. The numerically controlled machining system as claimed in claim 1, wherein said numerical control device comprises an automatic program numerical control device.

10. The numerically controlled machining system as claimed in claim 9, wherein said numerical control device operates in respone to an automatic program provided by said numerical control device.

* * * * *